F. MORANDI.
CULINARY VESSEL.

No. 174,555. Patented March 7, 1876.

Witnesses.
Geo Gray
F. W. Hale

Francis Morandi
by his attorney
F. P. Hale

UNITED STATES PATENT OFFICE.

FRANCIS MORANDI, OF MALDEN, MASSACHUSETTS.

IMPROVEMENT IN CULINARY VESSELS.

Specification forming part of Letters Patent No. 174,555, dated March 7, 1876; application filed January 17, 1876.

*To all whom it may concern:*

Be it known that I, FRANCIS MORANDI, of Malden, in the county of Middlesex and State of Massachusetts, have invented a new and useful Improvement in Culinary Vessels; and I do hereby declare that the following is a full, clear, and exact description thereof, which will enable others skilled in the art to which it pertains to make and use the same, reference being had to the accompanying drawing, and to the letters of reference marked thereon, which forms a part of this specification.

Figure 1:
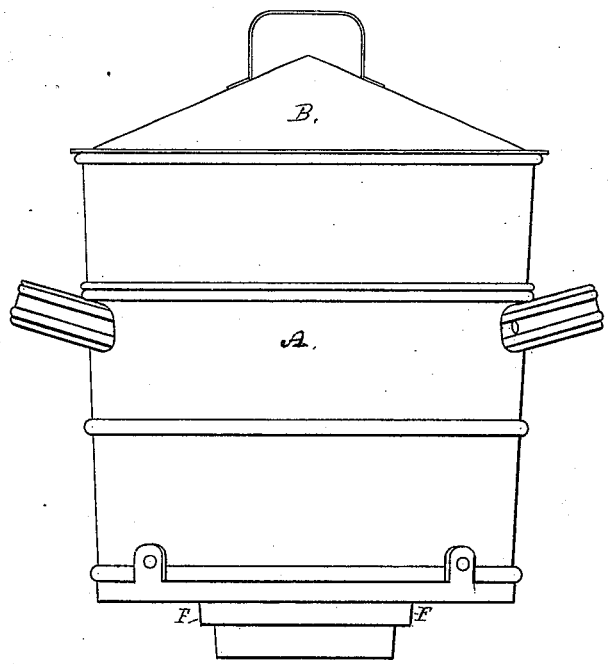
Figure 2:
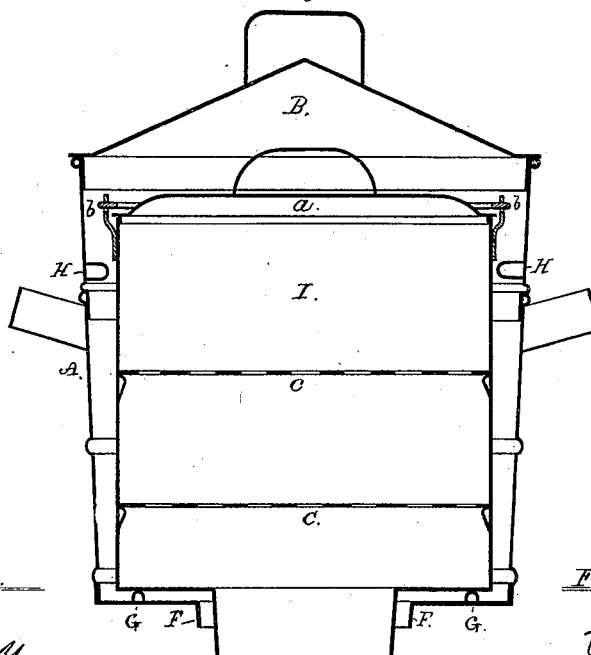

In said drawing, Figure 1 is a side elevation, and Fig. 2 a vertical and central section, of a boiling and steaming apparatus constructed in accordance with my invention.

My invention has reference to the cooking of articles of food by the process of boiling or steaming, and has for its object the remedying of certain evils or defects incident to the methods ordinarily employed.

On January 31, 1871, Letters Patent were granted to me for an improvement in culinary vessels adapted to the cooking of articles of food by the process called "frying," by which all the odors, &c., generated in the process were conveyed down through the boiler-opening (in which the vessel was arranged) and discharged into the escape-flue of the stove or range. By experiment, I have found that, by dispensing with the "spider" or frying vessel and substituting a boiler or steamer constructed as hereinafter described, a most complete and effective apparatus for the boiling and steaming of articles is attained, the steam and odors of the articles while being cooked being conveyed into the flue-space of the stove or range with equal effectiveness as in my said patented device.

My improved apparatus is to be used in one of the boiler-openings in the top plate of a stove or range.

In the said drawing, A denotes a cylindrical case or vessel open at both top and bottom, the top being provided with a cover, B, and the case having two handles affixed thereto.

The bottom I prefer to make of cast-iron or sheet-iron, and by means of ears formed thereon to rivet the same to the vessel A. This bottom has an opening made through it, a circular flange, F, extending down therefrom, the same being of a diameter to fit into the boiler-opening of a stove or range.

G G, &c., are a series of horizontal ribs which are disposed on and extend up from the bottom of the case. H H, &c., are another series of vertical ribs, which are affixed to the inner surface of the sides of the case, the same being arranged as shown in Fig. 2. I is a boiler which is disposed within the vessel or case A, its bottom being of a somewhat less diameter than the opening in the bottom of the case A through which it projects. The said boiler I prefer to provide with a cover, $a$, as shown in the drawing, and also with a bail, $b$, the latter enabling the boiler to be readily inserted or removed from the case A. This boiler is provided with one or more perforated diaphragms $c$ which rest upon ledges affixed to the inner walls of the boiler. By the employment of diaphragms, articles may be steamed whenever desirable.

I would remark that the cover to the boiler is not essential, as the cover of the case A will prevent the escape of steam and odor, but I prefer to employ it, as it better retains the steam within the boiler and thereby renders the cooking of the articles therein more expeditious.

The object of the two series of projections or ribs is not only to centralize and support the boiler in its proper position over the fire, but to form and maintain a flue around the entire surface of the boiler, whereby the steam and odors from the articles being cooked may be readily conveyed into the escape-flue of the stove or range to which the apparatus may be applied.

I would remark that the case A may, if desirable, be made in two or more annular sections, one section lapping upon the other.

From the above, it will be seen that by my present improvement I attain a most effective and convenient apparatus for the boiling and steaming of articles of food, and prevent the escape of the steam and odors arising therefrom into the room.

I do not herein claim the apparatus described and claimed in my said patent for frying articles of food, nor do I claim the inventions as shown and described in Letters Patent No. 89,189 or No. 91,697, as my invention differs from both of them; but especially disclaim the same.

What I claim is—

The above-described improved culinary apparatus, consisting of the case A provided with a perforated bottom, D, cover B, a series of horizontal and vertical ribs, G H, and the boiler I, the whole being constructed, arranged, and combined together in manner and so as to operate as set forth.

In testimony that I claim the foregoing as my own invention I affix my signature in presence of two witnesses.

FRANCIS MORANDI.

Witnesses:
F. P. HALE,
F. C. HALE.